A. L. POWELL.
NEEDLE AND GUARD THEREFOR.
APPLICATION FILED NOV. 25, 1914.
1,174,761.
Patented Mar. 7, 1916.
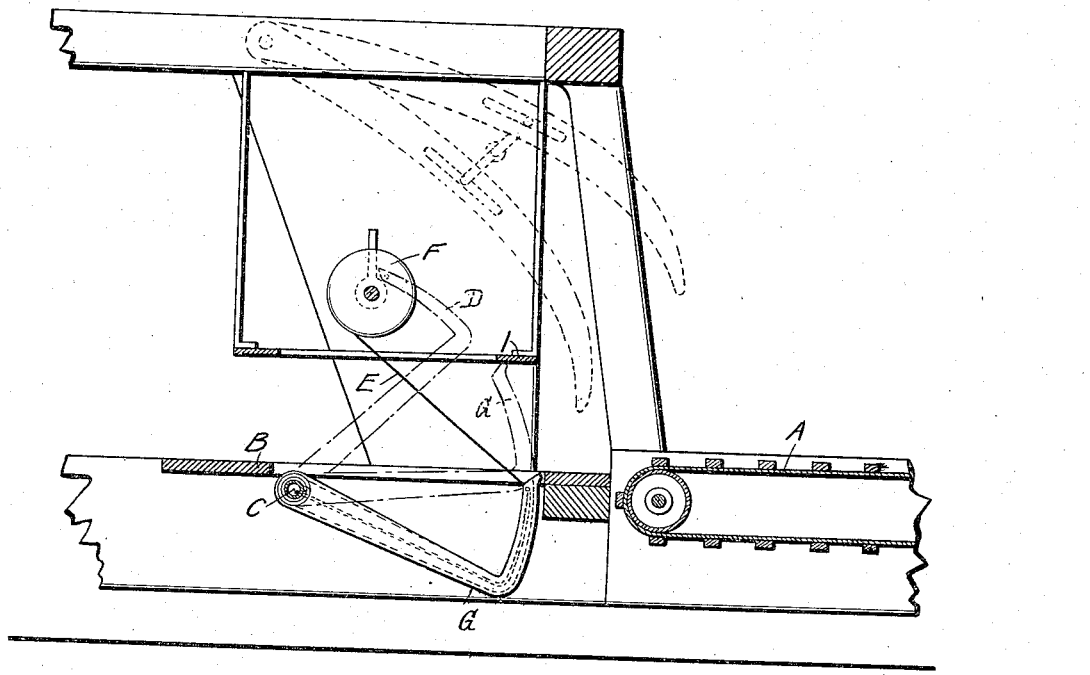
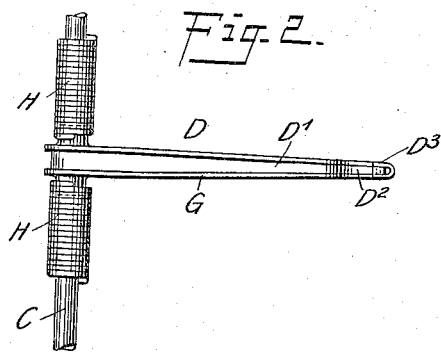
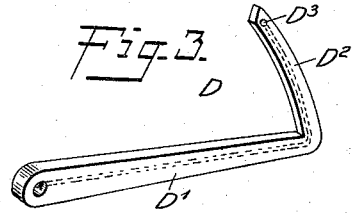
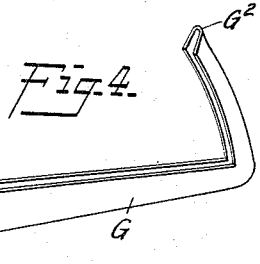
WITNESSES
George L. Blume.
INVENTOR
Athol L. Powell
BY
ATTORNEYS

UNITED STATES PATENT OFFICE.

ATHOL LINNWOOD POWELL, OF ALAMO, TENNESSEE.

NEEDLE AND GUARD THEREFOR.

1,174,761.   Specification of Letters Patent.   Patented Mar. 7, 1916.

Application filed November 25, 1914. Serial No. 873,882.

*To all whom it may concern:*

Be it known that I, ATHOL LINNWOOD POWELL, a citizen of the United States, and a resident of Alamo, in the county of Crockett and State of Tennessee, have invented a new and Improved Needle and Guard Therefor, of which the following is a full, clear, and exact description.

The invention relates to grain harvesters and binders, such as shown and described in the Letters Patent of the United States, No. 1,023,035, granted to me on April 9, 1912.

The object of the present invention is to provide a new and improved needle and guard therefor, arranged to permit of using a needle without a crank arm and thus allow of swinging the needle downward without danger of striking the ground, the needle guard serving to cut off the loose grain from the needle and to prevent it from passing in behind the needle and clogging the movement thereof.

For the purpose mentioned, use is made of a knotter wheel, a needle coöperating therewith and a guard for the said needle and moving with the same during a part of its motion to and from the said knotter wheel.

A practical embodiment of the invention is represented in the accompanying drawings forming a part of this specification, in which similar characters of reference indicate corresponding parts in all the views.

Figure 1 is a sectional side elevation of the needle and its guard as applied to a grain harvester and binder of the type above referred to; Fig. 2 is a plan view of the needle and its guard; Fig. 3 is a perspective view of the needle; and Fig. 4 is a like view of the guard.

The grain cut by the cutter bar and acted on by the usual reel drops onto a platform A in the form of a slotted endless belt which delivers the cut grain to the binder table B below which is arranged an oscillating shaft C carrying a needle D made hollow for the passage of the twine E, as indicated in the drawings. The needle D serves to carry the twine E around the sheaf and to operate in the usual manner in conjunction with a knotter wheel F to tie the twine around the sheaf. The needle D consists of a shank $D'$ secured to the hollow shaft C and a segmental arm $D^2$ terminating in an eye $D^3$ for the passage of the twine E, so that the latter extends to the knotter wheel F, as indicated in Fig. 1. Normally the point of the needle D is below the upper surface of the binder table B, as indicated in Fig. 1, and when the grain harvester and binder is in operation then an upward swinging motion is given to the needle to cause the latter to coöperate with the knotter wheel F to tie the twine around the sheaf, and when this has been done the needle returns to its lowermost dormant position, as shown in Fig. 1.

The needle D when in lowermost position is shifted within a guard G, open at the top and of the same shape as the needle. The guard G is provided with a hub $G'$ mounted to turn loosely on the shaft C, and the said hub is pressed on by the ends of coil springs H secured at their outer ends to the shaft C. By the arrangement described, the guard G is spring-pressed and overlies the needle D when the latter swings upward until the point $G^2$ of the guard G strikes a stop I forming part of the frame so that the guard G is held against further movement during the time the needle D completes its upward stroke to the knotter wheel F. When the needle D is on the return or downward stroke it reënters the guard G and carries the same along in a downward direction against the tension of the springs H.

From the foregoing it will be seen that by the arrangement described the needle D is shifted while in lowermost dormant position and during a portion of its upstroke and a portion of its downstroke so that the loose grain is cut off from the needle and is prevented from passing in behind the needle and choking the same.

It is understood that the stop I is located a distance above the binder table B and hence the grain cannot pass under the needle while the latter is in raised position, as indicated in dotted lines in Fig. 1. During the time the needle is in the raised position the oncoming grain accumulates on the upper arm of the guard G now in raised position, and when the needle swings downward and carries the guard along then the accumulated grain can pass over the binder table B for forming the next sheaf in the manner above described.

Directly above the binder table B operate the usual packing arms indicated in Fig. 1 to pack the grain against the trip arm until sufficient grain has accumulated to form a sheaf and then the sheaf is encircled by the needle for tying the twine around the sheaf, as previously explained.

Having thus described my invention, I claim as new and desire to secure by Letters Patent:

1. In a grain harvester and binder, a binder table, a knotter wheel arranged above the binder table, an oscillating hollow shaft arranged below the binder table, a needle coöperating with the knotter wheel and carried by the hollow shaft, the needle being made hollow for the passage of the twine, a guard open at the top and adapted to sheath the needle during a portion of its motion to and from the knotter wheel, the guard having hub portions projecting from the opposite sides and mounted to turn loosely on the hollow shaft, coil springs secured at their outer ends to the shaft and pressing at their inner ends on the said hub portions, and a stop arranged between the binder table and the knotter wheel and forming part of the frame of the machine, the free end of said guard engaging the stop to hold the guard against further upward movement as the needle completes its stroke to the knotter wheel, the said needle on its return movement reëntering the guard and carrying the same in a downward direction against the tension of the springs.

2. In a grain harvester and binder, a binder table, a knotter wheel arranged above the binder table, an oscillating hollow shaft arranged below the binder table, a needle coöperating with the knotter wheel and carried by said shaft, the said needle being made hollow for the passage of the twine, the needle having a shank and a segmental arm, a guard for said needle open at the top and corresponding in shape to the needle, the guard having hub portions projecting from opposite sides and mounted to turn loosely on the hollow shaft, the said needle being adapted to fit between the side members of the guard, when the guard and needle are in the lowermost position, the free ends of said needle and guard being normally below the upper surface of the binder table, a spring secured to the shaft and pressing the said guard to incase the needle and to cause the same to follow the needle during a portion of its upward stroke, and a stop arranged between the binder table and the knotter wheel and forming part of the frame of the machine, the free end of said guard engaging the stop to hold the guard against further upward movement, as the needle completes its upward stroke to the knotter wheel, the said needle on its return movement reëntering the guard and carrying the same in a downward direction against the tension of the spring.

In testimony whereof I have signed my name to this specification in the presence of two subscribing witnesses.

ATHOL LINNWOOD POWELL.

Witnesses:
DAVID H. POWELL,
CLAUDE F. POWELL.

Copies of this patent may be obtained for five cents each, by addressing the "Commissioner of Patents, Washington, D. C."